June 18, 1963 C. O. GLASGOW 3,094,146
FLUID PRESSURE CONTROL SYSTEM
Filed Dec. 28, 1959 2 Sheets-Sheet 1
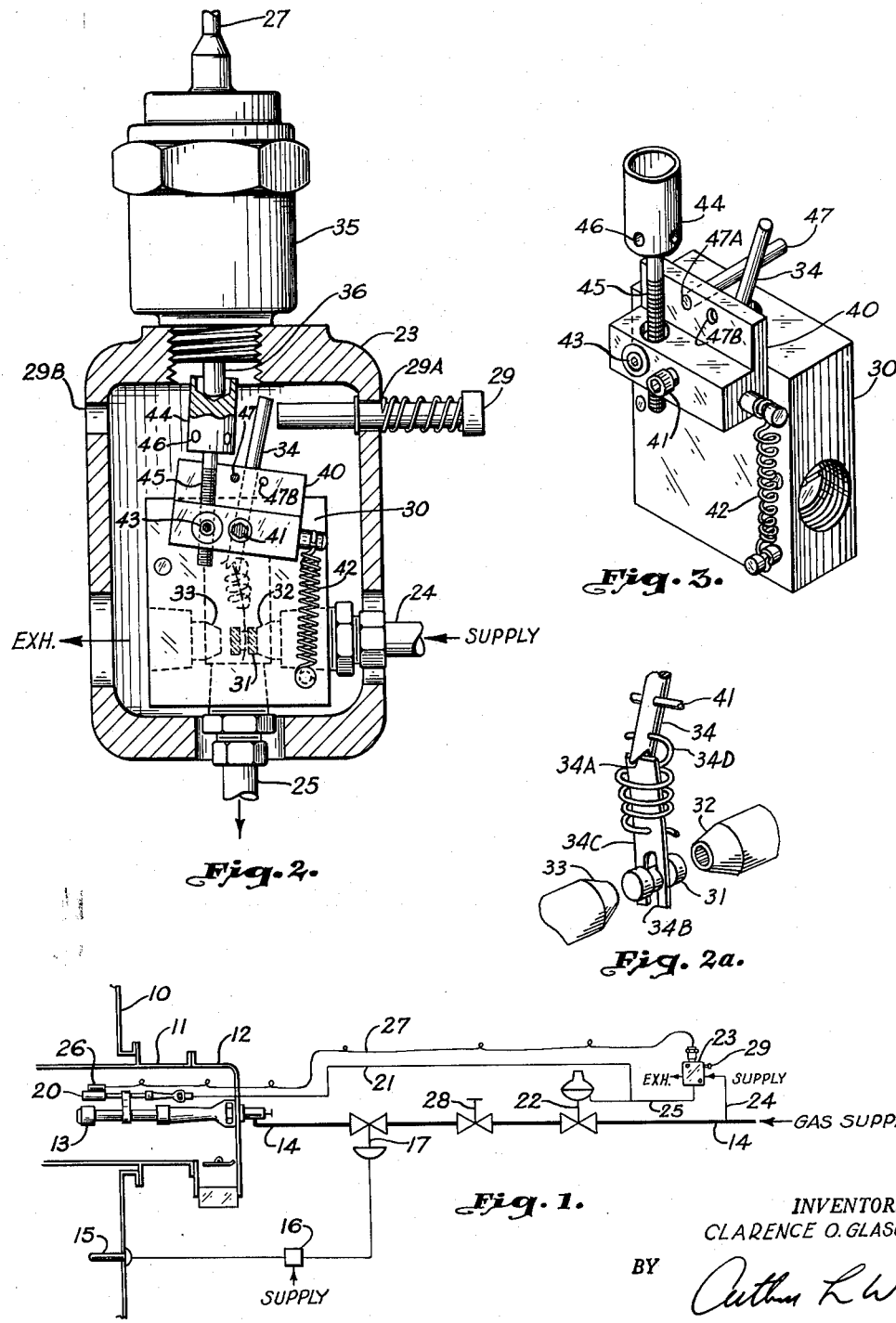
INVENTOR.
CLARENCE O. GLASGOW
BY
Arthur L. Wade
ATTORNEY

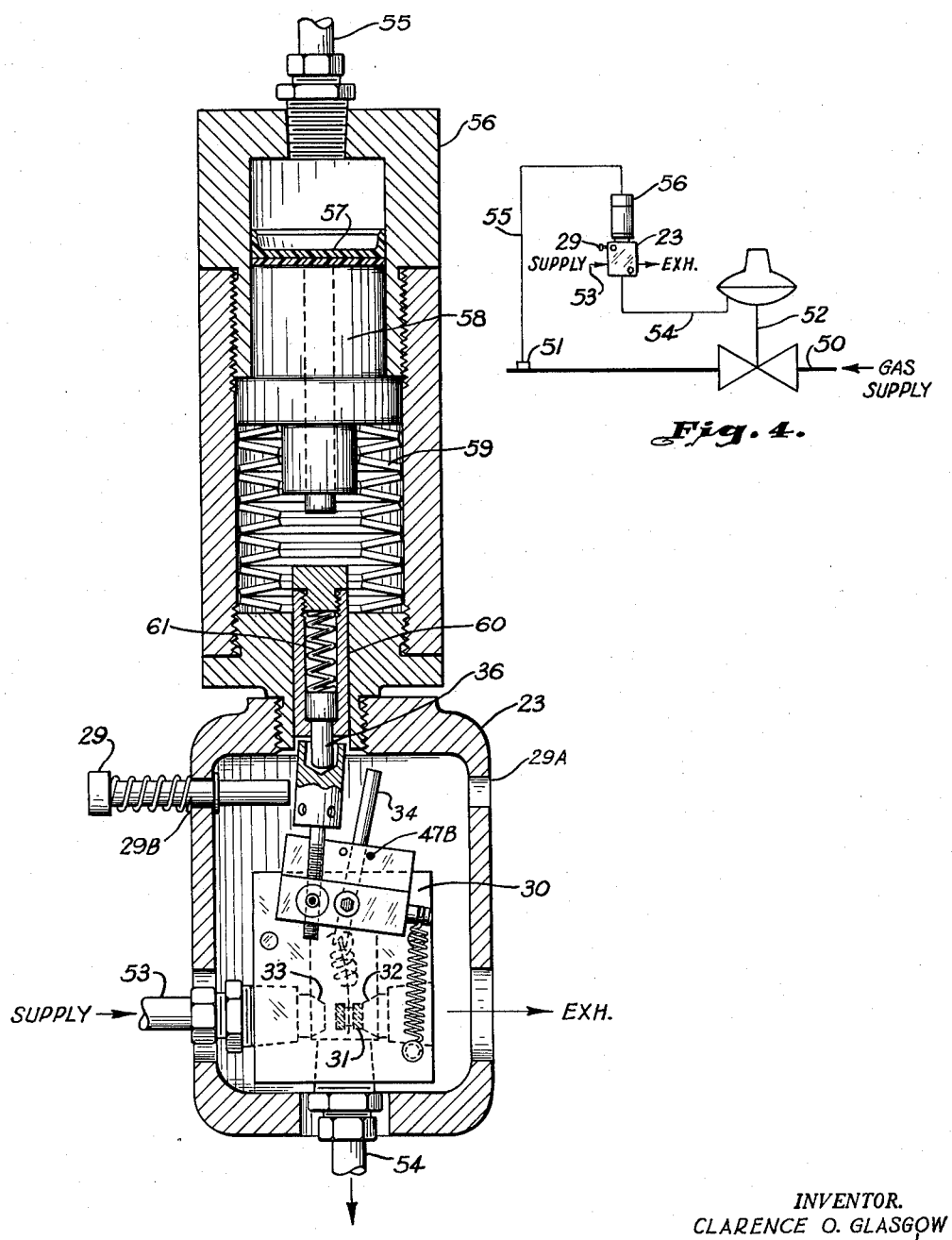

United States Patent Office 3,094,146
Patented June 18, 1963

3,094,146
FLUID PRESSURE CONTROL SYSTEM
Clarence O. Glasgow, Tulsa, Okla., assignor to National Tank Company, Tulsa, Okla., a corporation of Nevada
Filed Dec. 28, 1959, Ser. No. 862,246
4 Claims. (Cl. 135—596.14)

The present invention relates to control of fluid pressures. More specifically, the invention relates to actuating a valve between two positions, the valve having an output fluid pressure in each position which is applied to a regulating element for a variable condition.

Swatsworth 2,860,660 issued November 18, 1958. The disclosure of this patent represents a valve whose two positions control fluid pressures to establish one of two output fluid pressures. In general, two different fluid pressures are applied to the input ports of the valve and either of these inputs is selected as an output by alternately positioning the valve element. One of the selected pressures could, of course, be the pressure of atmosphere; this pressure would be, in effect, a vent for the regulating element connected to the valve output.

When a valve of the Swatsworth type is incorporated in a control system, automatic or semi-automatic, there is a problem of applying the mechanical forces into which variable conditions are transduced to actuate such valve between its two, alternate, positions. The control system contemplated generally responds to a variable, such as temperature or pressure, which must be transduced into a mechanical motion with which to shift the Swatsworth valve between the alternate positions for the valve at predetermined values of the variable. Superimposed upon this basic problem of applying transduced forces directly is the additional problem of conveniently providing for the selection of the desired one of the alternate positions the valve takes as each of the predetermined values of the variable condition is approached. Also, there is the problem of conveniently providing for setting the value of the variable at which the shift of the valve position will take place. Finally, there is the problem of providing for a convenient means with which the valve can be manually returned to the position it had before it was actuated by the mechanical motion of the transducer.

A principal object of the present invention is to directly actuate and reset the position of a three-way, snap-acting, mechanically-positioned, fluid pressure valve for controlling fluid pressure with a combination of forces produced automatically and manually and which are related to a variable condition.

Another object is to predetermine a value of the variable condition and the direction of approaching this value which will position the valve to a selected one of its alternate positions.

Still another object is to carry out the functions of selected actuation of the valve with parts which are simple, rugged, readily assembled and adjusted with elementary tools.

The present invention contemplates a three-way, snap-acting, mechanically-positioned, fluid pressure valve mounted in fixed relation to a transduction system which provides for the mechanical motion of the transduction system to be applied directly to the valve element from a first of the two directions of actuation of the valve as the variable transduced changes in a first of two possible directions of variation. A manually movable member is also provided and mounted so it can be used to move the valve element in the second of its two directions of actuation.

The invention further contemplates the provision of linkage in the transduction system which can be readily rearranged to provide for the transduction system to apply its mechanical motion to the valve element from the second of its two possible directions of actuation as the variable transduced changes in the second of its two directions of variation. Further, provision is made for the manually movable member to be readily remounted so the valve element can be manually moved in the first of its two directions of actuation.

Other objects, and advantages of the present invention will become readily apparent from the following detailed description of the invention with specific references to the accompanying drawings in which:

FIG. 1 is a schematic illustration of a safety shut down system for the pilot light of a burner in which the present invention is embodied;

FIG. 2 is a partially sectioned front elevation of a part of the system of FIG. 1;

FIG. 2A is a perspective of a portion of the internal structure of the valve of FIG. 2;

FIG. 3 is an isometric view of a portion of the structure of FIG. 2;

FIG. 4 is a schematic illustration of a safety shut down system for a gas flow in which the invention is embodied;

FIG. 5 is a partially sectioned front elevation of a part of the system of FIG. 4.

THE SYSTEM GENERALLY

Referring specifically to FIG. 1, a representation of a complete system is shown in which the present invention is embodied. A furnace wall is represented at 10. This furnace represents various spaces which it is desired to heat by burning fuel. A burner tube 11 is mounted in the wall 10. A burner front 12 closes the end of tube 11 and supports a burner structure 13 within the tube. Burner 13 functions to mix air, and the fuel supplied through conduit 14, for the propagation of a flame within tube 11. The heat supplied the furnace by the flame propagated from the burner in the tube is detected by a temperature responsive element 15.

Temperature responsive element 15 is used to generate a control signal by any of several well known devices represented at 16. The output of transmitter 16 is indicated as a fluid pressure applied to the modulation of main fuel valve 17.

Burner 13 may be operated intermittently. During the periods the burner is shut down, it is generally desired to maintain a pilot light. Therefore, pilot light structure 20 represents a source of continuous flame near the end of burner 13. In the system disclosed, pilot light 20 is supplied gas directly from fuel conduit 14 by conduit 21.

If pilot light 20 should go out, it is logical to assume that main burner 13 is also out. While both of these burners are out it is desired that the supply of fuel to both burner 13 and pilot light 20 be cut off. Otherwise, the fuel entering burner tube 11 would be an explosion hazard. Therefore, the present invention provides a system to continuously respond to the heat, as a condition, at pilot light 20. Should this pilot light go out, the system provides for valve 22 to shut off the main supply of fuel to burner 13 through conduit 14 and for the isolation of fuel from the pilot light.

In general, the system provides for a part of the main gas supply in conduit 14 to be drawn off by the conduit 24 through a three-way, snap-acting, mechanically-actuated, fluid pressure control valve within housing 23. This drawn-off portion of the main gas supply is taken from conduit 24 and into conduit 25 through the control valve mounted within 23. Pilot light conduit 21 is branched from conduit 25. Conduit 25 also applies the drawn-off portion of the fuel gas as a pressure with which to maintain shutdown valve 22 open as long as pilot light 22 is propagating its flame.

To actuate the control valve mounted within housing 23, a transducer is provided to convert the variable condition of pilot light heat into mechanical motion. The mechanical motion is transmitted by linkage in housing 23 to actuate the control valve mounted therein. The primary element of the transducer is indicated at 26 as a bulb, connected by a capillary pipe 27 to a receiver of the transducer mounted on housing 23. The transducer system, including the bulb, capillary and receiver, is filled with a fluid, usually mercury, which will expand when the heat of the pilot light flame is applied to bulb 26. The force generated by this expanding mercury moves a transducer element in a substantially linear path. The linkage between this movable transducer element and the control valve in housing 23 actuates the valve to connect conduit 25 to either the gas conduit 24 or exhaust.

*Operation of the System*

The system as disclosed in FIG. 1 can be operated in the following manner. With both the pilot light and main burner out, the control valve in housing 23 is positioned to block the fuel supply of conduit 24 from conduit 25. Therefore, valve 22 will isolate the main gas supply from burner 13.

Blocking valve 28 should now be manually closed and manual plunger 29 depressed to actuate the valve in housing 23 so conduits 24 and 25 will be connected. Fuel will reach pilot light 20 through conduit 21 which can then be lit by hand.

As bulb 26 responds to the heat of the pilot light flame, the mechanical movement generated by the transducer system will position the control valve of housing 23 to maintain conduits 24 and 25 connected after plunger 29 is released. With pilot light 20 propagating a flame, blocking valve 28 may be opened and burner 13 will light from pilot light 20. As the temperature in the furnace rises from the heat produced by burner 13, temperature responsive element 15 senses the temperature and regulates the main fuel valve 17 in accordance with the setpoint value predetermined by transmitter 16.

*Mechanism in Housing 23*

The housing 23 contains a mechanism which includes a three-way, snap-acting, mechanically-positioned, fluid pressure valve mounted in fixed relation to the transduction system so the mechanical motion produced by the transduction system will be directly applied to the actuating element of the valve. The control valve has two, alternate, positions. The transduction system produces a substantially linear motion along a fixed path. The system of FIG. 1 is arranged to indicate that an increase in temperature at pilot light 20 produces a motion which leaves the control valve in one of its two predetermined positions. In the position shown in FIG. 2, the control valve connects conduit 25 to exhaust and blocks conduit 24. An increase in temperature at pilot light 20 produces the alternate motion of the transducer which leaves the control valve free to be returned to its first of the two positions. In the first position, the valve connects conduits 24 and 25 and blocks both conduits from the exhaust so no fuel gas is lost from the system during normal operation.

It is generally desired to manually reset the control valve from either of its two positions to the alternate position. Additionally, it is desired that a convenient means be provided with which to predetermine the degree of heat which will actuate the control valve to either of its alternate positions. The present invention provides all these functions with parts that are simple, rugged, readily assembled and easily adjusted.

Referring more specifically to FIG. 2, the housing 23 interior is disclosed in greater detail. The cover with which the housing 23 is normally provided has been removed and sections taken of the housing and parts to illustrate their functions to better advantage.

The control valve is illustrated at 30, mounted directly on the housing 23 by bolts. The control valve, as illustrated, can be readily compared to the disclosure of Swatsworth 2,860,660. The snap-acting mechanism disclosed in that patent is incorporated in the control valve 30. The shuttle 31 is alternately snapped into position on seats 32 and 33 by actuation stem 34. In positioning on seats 32 and 33, shuttle 31 effectively blocks passage of gas through the seats.

FIG. 2A shows the arrangement of the stem 34, yoke 34C, spring 34D and shuttle 31 to greater advantage. As set forth in Swatsworth 2,860,660, yoke 34C is in the form of a thin plate. Any known means such as the slot 34A in the end of stem 34 may be used to engage the top of the yoke 34C. In the bottom of the yoke is a slot 34B designed to straddle opposite sides of the circumferential recess formed in shuttle 31. Around the slot engaged ends of the stem and yoke is a tension spring 34D, the convolutions of which surround the slot engaged ends of the yoke and the stem to give mechanical support to their engagement. Any known means may be used for fastening one end of the spring to the stem above the slot engagement and the opposite end of the yoke.

As valve stem 34 is pivoted about 41 the spring 34D develops a force transverse the axis of the stem 34. This transverse force is directed to carrying the shuttle 31, attached to the lower end of yoke 34C in slot 34B, against seat 32 or seat 33.

As heretofore described, the transducer is assumed to be in the position it takes when the pilot light 20 is out. The transducer is at one extreme limit of its range of mechanical travel over its fixed path. Stem 34 has been carried to the second of its two positions by the transducer. Shuttle 31 is seated on 32, isolating the gas of conduit 24 from conduit 25. Correspondingly, conduit 25 is connected to exhaust through seat 33. Main shut down valve 22 is closed by its spring and no fuel gas is supplied burner 31 or pilot 20.

Stem 34 can be returned to the first of its two positions by plunger 29. Plunger 29 is slidingly mounted in hole 29A and urged outward by a spring until a key on its shaft limits the outward travel. The spring force is manually overcome by depressing plunger 29 and engaging stem 34. Sufficient manual force will shift the stem 34 and snap shuttle 31 to its seat on 33. Gas will then flow from conduit 14, through conduit 24 and into conduit 25. The result will be an opening of main shut down valve 22 and a supply of fuel for pilot burner 20. This will be referred to as the normal operation of the system.

The three-way, snap-acting, two position, fluid pressure control valve 30 is a simple, rugged, dependable means of selecting which of two fluid pressures will be its output. With a fluid pressure output, a large degree of flexibility for these safety systems is obtained. As an example, a number of burners can be interconnected readily. The burners could have their pilot supply conduits tied together. Failure of one of the pilots would shut down all the burners. Many other interconnections of several systems are made possible by the flexibility of using a valve such as 30 to directly control fuel gas supplied the pilot burner as fuel and the main shut down valve as an actuating force.

The transducer has been considered from bulb 26 to housing 23. More specifically, the mercury acts on a piston in housing 35 and plunger 36 is reciprocated along a vertical path within housing 23. It is the movement of this plunger 36 which is used directly to actuate control valve 30.

Control valve 30 has been considered from its mounting within housing 23 from which it has a fixed relation to the path over which plunger 36 moves. A linkage system extends between plunger 36 and valve stem 34 to complete the transduction and achieve the result of positioning the shuttle 31 between seat 32 and seat 33.

The linkage system centers around lever 40. FIGS. 2 and 3 should be considered together to gain the best appreciation of the shape of lever 40. Lever 40 is distinctively shaped and it may be somewhat difficult to gather, from a consideration of FIG. 2 only, the fact that 40 is basically a lever, pivoted at 41. A simple threaded bolt defines pivot point 41, and the bolt extends through lever 40 to mount in a hole of the body of control valve 30.

A spring 42 is attached to the valve body and the lever 40 in order to urge lever 40 to pivot clockwise (CW) about pivot 41. Plunger 36 of the transducer applies a force at swivel pivot 43 to rotate lever 40 counterclockwise (CCW), against the force of spring 42. To specifically transmit the force of plunger 36 to swivel pivot 43, plunger 36 depends into a socket of sleeve link 44. Sleeve 44 is threaded on link 45. Thus, the range of vertical travel of plunger 36 is adjusted with respect to the range of travel of swivel point 43. As point 43 travels in a slight arc about pivot 41, the swivel at pivot 43 is desirable in order to convert the vertical motion into the circular motion. Sleeve 44 is readily rotated to adjust it from the holes 46 by utilizing a simple tool.

The linkage is completed by contact pin 47 threadedly mounted in hole 47A in lever 40. Pin 47 is mounted at a right angle to the parallel planes in which plunger 36 and valve stem 34 move. Properly positioned in this right angle plane, as indicated in both FIGS. 2 and 3, pin 47 directly contacts valve stem 34 as lever 40 pivots CW about pivot 41. This direct contact and resulting snap of shuttle 31 onto seat 32, is illustrated as having taken place in FIGS. 2 and 3. The condition of no flame propagation which produces this particular position of valve 30 has been discussed.

Valve stem 34 may now be returned to its first position by plunger 29. In so moving, stem 34 will rotate lever 40 CCW. The socket engagement between plunger 36 and sleeve link 44 permits the linkage to be moved without disturbance of the transducer. When the heat of the pilot burner flame causes plunger 36 to move downward the plunger will positively contact the socket of link 44 and hold lever 40 against CW rotation by the force of spring 42. Plunger 29 can then be released and the second position of valve 30 will be maintained as long as a flame is propagated by burner 20.

*Alternate Control Arrangements*

Hole 47B is provided for alternate mounting of pin 47 on lever 40. FIG. 2 shows clearly that this alternate mounting will cause the lever 40 to position stem 34 to its first position upon CCW rotation of lever 40 about pivot point 41. From the foregoing description of how the transducer operates, it is now apparent that, in this alternate arrangement, an increase in temperature at bulb 26 will position stem 34 to the first position from the second position which is actually illustrated in FIGS. 2 and 3. Plunger 29 may then be mounted in hole 29B for resetting stem 34 to the second position by hand. Of course, reversal of the results of operating valve 30 to its alternate positions may also be achieved by reversing the connections of the input conduits to the seats 32 and 33.

Referring back to the system of FIG. 1, it is generally appreciated that the fluid pressure in conduit 25 could be applied to the control system of valve 17 to override the modulating signals from transmitter 16 during the period of pilot burner shut-down. The many alternate arrangements possible are readily achieved with the flexibility provided by the components of this system disclosed.

*Alternate Transducers*

FIGS. 1–3 have been devoted to illustrating heat as a condition to be transduced into an actuating force for the control valve 30. Referring to FIG. 4 a system responding to pressure as a variable condition is illustrated. The pressure of a gas being transported in conduit 50 is sensed at 51. Should the pressure in conduit 50 increase to a predetermined limit, the system disclosed will close valve 52 to bring the pressure at 51 down below the predetermined limit.

To develop the required control signal for valve 52, a transducer is caused to respond to the pressure at 51 and actuate control valve 30 in housing 23. Valve 30 is supplied from a source of fluid pressure through pipe 53. Normally, as long as the pressure in conduit 50 is below a predetermined value, valve 30 is positioned to connect supply pipe 53 with output pipe 54. Pipe 54 is connected to the underside of the diaphragm of valve 52. With supply pressure under the diaphragm, valve 52 is held open against the valve spring.

Now consider the change of the variable condition of pressure. As the pressure increases at 51, the valve 30 is moved to the position alternate to that shown in FIG. 5. Shuttle 31 is seated on 33. The supply pipe 53 is blocked and pipe 54 is connected to exhaust, or atmospheric pressure. With the valve diaphragm vented, the spring of valve 52 closes the valve, blocking the upstream pressure of conduit 50 from the downstream side of valve 52.

The transducer connected to housing 23 in FIGS. 4 and 5 is essentially a piston-cylinder combination. The pressure at 51 is transmitted by pipe 55 into cylinder head 56. A cup packing 57 receives this pressure and moves piston 58 downward. Springs 59 resiliently oppose the downward movement of piston 58.

The end of piston 58 descends and contacts plunger housing 60 to move it downward. Housing 60 contains a spring 61 which keeps plunger 36 extended downward as the lower, extreme, end of the housing 60. Thus plunger 36 is the specific element moved over the fixed, vertical path of the transducer to actuate the linkage system in housing 23 and shift valve 30 to the position opposite to that illustrated. Shuttle 31 is seated on 33, by this action, and the underside of the valve 52 diaphragm thereby vented, causing the valve 52 to close.

As the pressure at 51 lowers, contact pin 47 is carried away from stem 34. Plunger 29 can then be used to manually reset valve 30. If the pressure again rises high enough to trip valve 30, the cycle repeats until other action is taken in the system.

It should now be apparent that pin 47 can be positioned in hole 47A to provide a reversed relation between the variable condition and the control action taken with control valve 30. Manually operated plunger 29 can be shifted to the other side of housing 23 to reset the valve 30.

The spring 61 in plunger housing 60 forms a resilient link between the power mechanism of the transducer and plunger 36. Should excessive power be developed by the transducer, the spring becomes a limitation on the force actually applied to plunger 36 and the linkage system. This arrangement is generally referred to as providing transduced over-travel protection for the linkage system.

From the foregoing it will be seen that this invention is one well adopted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A control system including:
    a transducer responsive to a variable condition and positioning a plunger element along a substantially straight line path;
    a lever arranged in the path of the plunger element of the transducer and engaged by the plunger element and pivoted in the first of two directions;

a spring attached to the lever to pivot the lever in the second of the two directions;

a pin removably mounted on the lever as the actuating element of the lever;

a valve having two positions, each of which position establishes a fluid pressure output from a separate source of fluid pressure, and an actuated member positioned in the path of the actuating pin of the lever so the valve will be given the first of its two positions by the lever pin;

and a push rod mounted for manual actuation to contact the actuated member of the valve to give the valve the second of its two positions.

2. A control system including;

a transducer responsive to a variable condition and positioning a plunger element along a substantially straight line path;

a lever arranged in the path of the plunger element of the transducer and engaged by the plunger element pivoted in the first of two directions;

a spring attached to the lever to pivot the lever in the second of the two directions;

a pin removably mounted on the lever at a first position as the actuating element of the lever;

a valve having two positions, each of each positions establishes a fluid pressure output from a separate source of fluid pressure, and an actuated member positioned in the path of the actuating pin of the lever so the valve will be given the first of its two positions by the lever pin;

means for remounting the pin on the lever at a second position so the valve will be given a second of its two positions by the lever pin;

and a push rod mounted for manual actuation to contact the actuated member of the valve to give the valve the first of its two positions.

3. A control system including;

a transducer responsive to a variable condition and positioning a plunger element along a substantially straight line path;

a lever pivoted by the plunger element of the transducer in the first of two directions;

an adjustable link connected to the lever and contacted by the plunger element of the transducer to pivot the lever in the first of the two directions;

a spring attached to the lever to pivot the lever in the second of the two directions;

a pin removably mounted on the lever as the actuating element of the lever;

a valve having two positions, each of which positions establishes a fluid pressure output from a separate source of fluid pressure, and an actuated member positioned in the path of the actuating pin of the lever so the valve will be given the first of its two positions by the lever pin;

and a push rod mounted for manual actuation to contact the actuated member of the valve to give the valve the second of its two positions.

4. A control system including;

a transducer responsive to a variable condition and positioning a plunger element along a substantially straight line path;

a lever pivoted by the plunger element of the transducer in the first of two directions;

an adjustable link connected to the lever and contacted by the plunger element of the transducer to pivot the lever in the first of the two directions;

a resilient link arranged between the adjustable link and the transducer, whereby the lever is protected from over-travel of the transducer motion;

a spring attached to the lever to pivot the lever in the second of the two directions;

a pin removably mounted on the lever as the actuating element of the lever;

a valve having two positions, each of which positions establishes a fluid pressure output from a separate source of fluid pressure, and an actuated member positioned in the path of the actuating pin of the lever so the valve will be given the first of its two positions by the lever pin;

and a push rod mounted for manual actuation to contact the actuated member of the valve to give the valve the second of its two positions.

References Cited in the file of this patent

UNITED STATES PATENTS

| | | |
|---|---|---|
| 542,733 | Johnson | July 16, 1895 |
| 1,603,005 | Flam | Oct. 12, 1926 |
| 1,668,001 | Bolling | May 1, 1928 |
| 1,773,919 | Mauck | Aug. 26, 1930 |
| 1,820,510 | Tuck | Aug. 25, 1931 |
| 2,220,672 | Bloomheart | Nov. 5, 1940 |
| 2,675,965 | Schell | Apr. 20, 1954 |
| 2,703,101 | Cantwell | Mar. 1, 1955 |
| 2,785,661 | Stefan | Mar. 19, 1957 |
| 2,798,689 | Houghton | July 9, 1957 |
| 2,814,310 | Lower | Nov. 26, 1957 |
| 2,814,447 | Greenamyer | Nov. 26, 1957 |
| 2,831,504 | Coffey | Apr. 22, 1958 |
| 2,857,103 | Hajny | Oct. 21, 1958 |
| 3,018,791 | Knox | Jan. 30, 1962 |